United States Patent
Schwarz

(10) Patent No.: US 9,398,491 B2
(45) Date of Patent: Jul. 19, 2016

(54) METHODS AND APPARATUS FOR RESOURCE ALLOCATION BASED ON CHANGEABLE SERVICE LEVELS

(75) Inventor: Uwe Schwarz, Veikkola (FI)

(73) Assignee: Nokia Technologies Oy, Espoo (FI)

( * ) Notice: Subject to any disclaimer, the term of this patent is extended or adjusted under 35 U.S.C. 154(b) by 1491 days.

(21) Appl. No.: 11/521,198

(22) Filed: Sep. 13, 2006

(65) Prior Publication Data

US 2008/0076421 A1 Mar. 27, 2008

(51) Int. Cl.
*H04W 24/00* (2009.01)
*H04W 28/16* (2009.01)

(52) U.S. Cl.
CPC .................... *H04W 28/16* (2013.01)

(58) Field of Classification Search
CPC .............. H04W 44/001; H04W 72/08; H04W 72/0493; H04L 47/10
USPC .......................................... 455/452.1, 452.2
See application file for complete search history.

(56) References Cited

U.S. PATENT DOCUMENTS

| | | | |
|---|---|---|---|
| 6,175,621 B1 | 1/2001 | Begeja | 379/207 |
| 6,385,458 B1 | 5/2002 | Papadimitriou et al. | 455/456 |
| 6,980,523 B1 * | 12/2005 | Lipford et al. | 370/252 |
| 7,046,643 B1 | 5/2006 | Zellner et al. | 370/329 |
| 7,065,197 B1 * | 6/2006 | Ramella-Pezza et al. | 379/201.02 |
| 2003/0032427 A1 * | 2/2003 | Walsh et al. | 455/428 |
| 2004/0125800 A1 | 7/2004 | Zellner | 370/389 |
| 2005/0048983 A1 * | 3/2005 | Abraham et al. | 455/452.1 |
| 2005/0250509 A1 * | 11/2005 | Choksi | 455/452.1 |

FOREIGN PATENT DOCUMENTS

EP 1 686 752 A1 8/2006

OTHER PUBLICATIONS

Dictionary.com definition of "Priority", retrieved Jun. 17, 2013.*
Press Release, "Nokia spurs subscriber growth in New Growth Markets with mobility solutions", Mar. 30, 2006, 2 pgs.
3GPP TS 48.008 V7.6.0 (Jul. 2006), $3^{rd}$ Generation Partnership Project; Technical Specification Group GSM/EDGE Radio Access Network; Mobile Switching Centre—Base Station System (MSC-BSS) interface; Layer 3 specification (Release 7), 16 pgs.

* cited by examiner

*Primary Examiner* — Joshua Schwartz
(74) *Attorney, Agent, or Firm* — Harrington & Smith

(57) ABSTRACT

Subscribers are segmented in a telecommunications by allocating given first subscribers network resources with a lower priority than second subscribers, but allowing the first subscribers to temporarily upgrade their subscription by a self-service request. On detecting the request, the network updates the charging correspondingly and adapts the resource allocation of the first subscribers who made the request for a predetermined period and/or amount of phone calls. The network is also capable of signaling the subscribers their current resource allocation priority so that the subscribers can provide respective users with a feedback of changes in resource allocation. The mechanism is also applicable for temporarily lowering the priority of given subscribers in resource allocation.

27 Claims, 3 Drawing Sheets

METHODS AND APPARATUS FOR RESOURCE ALLOCATION BASED ON CHANGEABLE SERVICE LEVELS

FIELD OF THE INVENTION

The present invention generally relates to controlling access to telecommunications networks.

BACKGROUND OF THE INVENTION

Market segmentation means providing markets with differentiated products or services such that substantial price difference may prevail between different segments. For instance, presently most economical mobile phones may cost 5 percent of the price of the high-end mobile phones. This allows both establishing wide markets ranging from entry level customers to heavy users who can afford more. However, until recently there has not been corresponding segmentation for the network access. Recently new mobility solutions embodying the concept of giving subscribers choices of different service levels have been presented. With such concept, an economy subscription to a mobile telecommunications network can have lower call tariffs with a somewhat higher probability of blocked or dropped calls during busy hours. A business subscriber will enjoy very high call success rates but also pay a higher tariff. In effect, this concept provides subscriber segmentation in mobile networks—offering different subscriber classes different products with corresponding price levels. This concept has been well received on developing markets because it allows addressing the not yet subscribers with very attractive tariffs. Entry level subscribers appreciate lower tariffs and accept lowered service quality. However, it may be found excessively undesirable if the lower service level can prevent placing an important and urgent personal call. After all, one of the key benefits of having a mobile phone is that often one can call friends or relatives in urgency.

It should be borne in mind that cellular networks are not always reachable and thus even though they can save lives, there may be occasions in which the network or necessary network resources are not available and therefore mobile operators cannot guarantee the access to their networks nor can they be held liable for possible failure to access their networks. Thus, even when in urgency, the mobile telephone may not be able to make desired phone calls due to network congestions or radio access failure. Emergency calls may be prioritized over all other calls to reduce the risk that congestion would prevent calling an ambulance or fire engine, for example, but even these calls cannot be guaranteed.

The most typical segmentation approach in telecommunication network subscriptions relates to the services availed to subscribers. It is broadly accepted that different data and messaging services can be charged with charges depending on the value of those services to the customer and on the availability of resources required for these services. However, even in industrial countries the telecommunications network operators still gain most of their revenues from traditional voice communication and text messaging. Hence, there is a need to provide segmentation in telecommunication network access which would avoid and/or mitigate the problems associated with the present solutions.

SUMMARY

According to a first aspect of the invention there is provided a phone call prioritizer for a telecommunications system having a plurality of subscribers and limited network resources, comprising:

a memory configured to store individual priorities associated with different subscribers;

a resource allocator configured to allocate network resources to subscribers who need network resources in accordance with the individual priorities; and an input configured to receive a signal indicative of a change request from a requesting individual subscriber;

wherein the prioritizer is capable of temporarily changing the individual priority of the requesting individual subscriber responsive to the change request.

The call prioritizer of the first aspect allows allocating lowered priorities to individual subscribers for market segmentation and temporarily increasing the priority on an individual basis responsive to their requests. Hence, using the call prioritizer of the first aspect subscribers may obtain a lowered service level subscription and yet place particularly important phone calls with a temporary preference in resource allocation.

The call prioritizer may be configured to allocate network resources to the individual subscribers who requested resource allocation change in preference to subscribers who have not requested resource allocation change. Hence, the prioritizer may temporarily enhance the access to network also in preference over normal subscribers.

The prioritizer may be configured to change the individual priority of the requesting individual subscriber for the duration selected from the group consisting of: next phone call; predetermined number of subsequent phone calls originated by the requesting subscriber; on-going phone call; predetermined period of time starting from the request; predetermined period of time starting from the next phone call originated by the requesting subscriber.

The call prioritizer of the first aspect also allows allocating increased priorities to individual subscribers for market segmentation and temporarily decreasing the priority of individual basis responsive to their requests. Hence, using the call prioritizer of the first aspect subscribers may obtain a normal service level subscription and yet place less important phone calls with a temporarily lower priority in resource allocation.

The change request may be signalled by a supplementary string selected from a group consisting of at least one of a prefix string and a postfix string.

Advantageously, signaling the change request by said supplementary string enables using existing terminal equipment.

The change request may be identified by a predetermined code in the supplementary string.

The telecommunications system may comprise a mobile switch centre, and the prioritizer may be configured to evoke a multi level precedence and preemption feature in the mobile switch center to command the mobile switch center to apply maximum priority level.

The call prioritizer may comprise: a service control point; a switch centre; a network controller; a packet data scheduler; a base station subsystem and any combination thereof.

The call prioritizer may consist of a single network entity effectively forming the call prioritizer. The call prioritizer may be capable of configuring a prior existing network capable of producing a subscriber segmentation service in which subscribers may have a lowered priority to network resources with an option of temporarily obtaining increased priority to the network resources.

The call prioritizer may be functionally distributed an entity comprising two or more functionally separate elements.

The telecommunications system may be a mobile communications system. Mobile communications systems typically have more constrained network access resources that fixed systems and hence mobile communications systems may benefit from the prioritizer of the first aspect even more than fixed networks. The contention ratio may be enhanced in fixed networks when using the prioritizer of the first aspect by connecting more subscribers to a common node, as it is still possible to place calls when urgent even if the resources would be entirely occupied.

According to a second aspect of the invention there is provided a method for prioritizing phone calls in a telecommunications system having a plurality of subscribers and limited network resources, comprising:
storing individual priorities associated with a set of the subscribers;
allocating network resources to subscribers who need network resources in accordance with the individual priorities;
receiving a signal indicative of a change request from a requesting individual subscriber; and
temporarily changing the individual priority of the requesting individual subscriber responsive to the change request.

According to a third aspect of the invention there is provided a program for controlling a resource allocator for prioritizing phone calls in a telecommunications system having a plurality of subscribers and limited network resources, comprising:
digital data processor executable instructions capable of enabling the resource allocator to implement the method of the second aspect of the invention.

The data processor executable instructions of the third aspect may consist of instructions executable by any one of the following: a multipurpose processor such as a microprocessor; an application specific integrated circuit; a digital signal processor; and a master control processor.

According to a fourth aspect of the invention there is provided a memory medium carrying the program of the third aspect.

According to a fifth aspect of the invention there is provided a signal carrying the program of the third aspect.

According to a sixth aspect of the invention there is provided a telecommunications network comprising having a plurality of subscribers and limited network resources, the telecommunications network comprising:
a memory configured to store individual priorities associated with different subscribers;
a resource allocator configured to allocate network resources to subscribers who need network resources in accordance with the individual priorities; and
an input configured to receive a signal indicative of a change request from a requesting individual subscriber;
wherein the telecommunications network is capable of temporarily changing the individual priority of the requesting individual subscriber responsive to the change request.

According to a seventh aspect of the invention there is provided a mobile station comprising:
a user interface configured to input a selection of a desired B-subscriber for a telephone call and configured to input a user indication of a special call;
wherein the mobile station comprises a processor configured to form a request for temporary priority change for the telephone call to the desired B-subscriber responsive to the indication of a special call.

The user interface may be configured to provide a menu option for indication of the special call.

The user interface may be configured to provide a short-cut key for indication of the special call.

The user interface may be configured to detect the indication of the special call from a pre-determined string of commands, such as a predetermined string of key strokes.

According to an eighth aspect of the invention there is provided a method comprising:
inputting a selection of a desired B-subscriber;
inputting a user indication of a special call; and
forming a request for temporary priority change for the telephone call to the desired B-subscriber responsive to the indication of a special call.

According to a ninth aspect of the invention there is provided a program for controlling a mobile station, comprising:
digital data processor executable instructions capable of enabling the mobile station to implement the method of the eighth aspect of the invention.

According to a tenth aspect of the invention there is provided a phone call prioritizer for a telecommunications system having a plurality of subscribers and limited network resources, comprising:
means for storing individual priorities associated with different subscribers;
means for allocating network resources to subscribers who need network resources in accordance with the individual priorities; and
means for receiving a signal indicative of a change request from a requesting individual subscriber;
wherein the prioritizer is capable of temporarily changing the individual priority of the requesting individual subscriber responsive to the change request.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will now be described, by way of example only, with reference to the accompanying drawings, in which.

DETAILED DESCRIPTION

Figure 1:
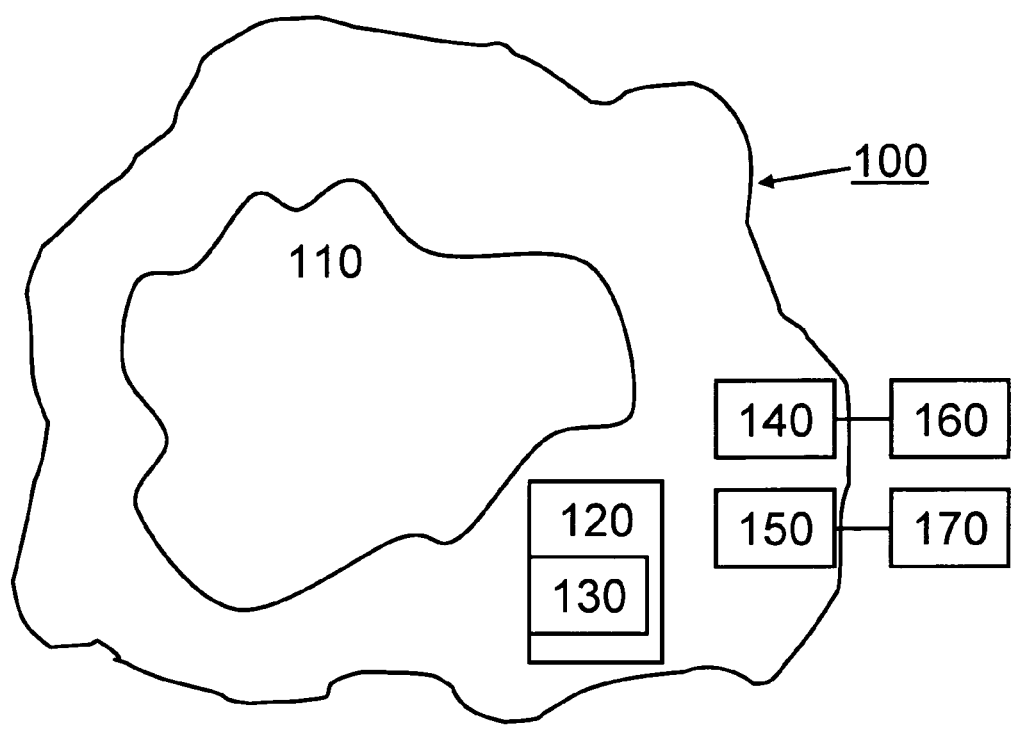
FIG. 1 presents a block diagram of a telecommunications system illustrating one example of the present invention.

FIG. 1 presents a block diagram of a telecommunications system 100 illustrating one example of the present invention. The telecommunications system 100 comprises a telecommunications network 110, a plurality of user terminals 120 typically associated with respective subscribers 130, and interfaces 140 and 150 for connecting to the internet 160 and to other telecommunications systems 170, respectively. The telecommunications network is typically a public switched telecommunications network (PSTN), a cellular telecommunications network such as GSM, Wideband Code Division Multiple Access (W-CDMA), IS-95, Personal Digital Communications network (PDC) or a satellite telecommunications network. The telecommunications system may also comprise a number of different telecommunications networks in which case the invention can be applied to any or all of such networks depending on implementation. In the following, the network 110 is described using GSM as an example so that the network comprises normal GSM network elements (not shown in FIG. 1) including a Home Location Register (HLR), a Mobile Switching Centre (MSC), Visiting Location Register (VLR) and a plurality of base station subsystems (BSS) including base station controllers (BSC) and base transceiver stations (BTS).

Figure 2:
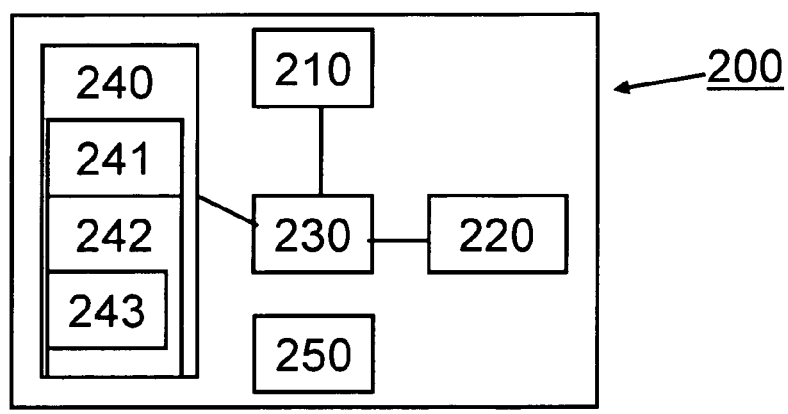
FIG. 2 presents general structure of user terminals in the telecommunications systems of FIG. 1

FIG. 2 presents general structure of the user terminals 120 in the telecommunications systems of FIG. 1. The user terminals 120 comprise a communications block 210, a work memory 220, a non-volatile memory 230 comprising operating instructions, a processor 240 for executing the operating instructions and accordingly controlling other blocks of the user terminal, and a user interface 250 for providing output to a user and reading user input. The user interface 250 typically comprises, for data output, a display and/or a speaker. For data input, the user interface 250 typically comprises one or more of the following: dedicated buttons, soft keys, touch screen, microphone, voice recognition circuitry, and pointing device. The processor is typically a master control unit MCU. Alternatively, the processor may be a microprocessor, a digital signal processor or an application specific integrated circuit.

Figure 3:
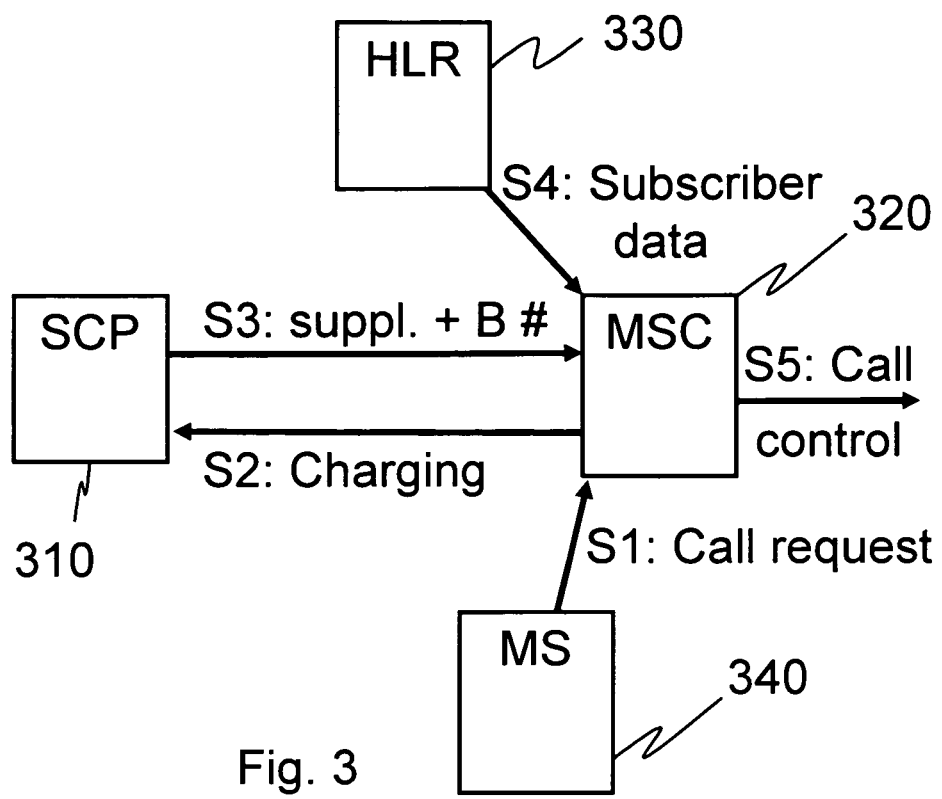
FIG. 3 presents a simplified block diagram of a telecommunications system illustrating an example of the present invention.

FIG. 3 presents a simplified block diagram of a telecommunications network 110 illustrating a first example of the present invention. FIG. 3 shows three main blocks referred to as a Service Control Point (SCP) 310, a Mobile Switching Centre (MSC) 320 and a Home Location Register (HLR) 330. FIG. 3 further shows a user terminal that in this case is a Mobile Station (MS) 340. In this example, the service control point 310 operates as part of an intelligent network.

When a user or more accurately A-subscriber of the MS is starting a phone call, the MSC receives a first signal S1 for call request from the MS to a call recipient, that is, B-subscriber. It is appreciated that there is usually a base station subsystem between the MS and the MSC, although not drawn here. Further, the B-subscriber need not be a subscriber of common network or network operator with the MS. The first signal S1 triggers a second signal representing detection point DP2 for the SCP indicative of the need to check the subscriber's chargeability and start charging. The SCP responds to the second signal S2 with a third signal S3. In case that the MS subscription is an economy subscription in which the subscribers are allocated lowered service level in comparison to other subscribers, the third signal contains supplementary data together with the B-subscriber number. Typically the supplementary data is represented as a prefix or postfix to the B-subscriber number. The MSC next receives the third signal and obtains the subscriber data of the A-subscriber in a fourth signal S4. The subscriber data typically comprises enhanced Multi Level Precedence and Preemption (eMLPP) service information implemented in HLR & MSC including ISDN User Part (ISUP) add-on information. Next, the MSC sends a fifth signal comprising call control information to the base station subsystem(s) in communication with the MS, which are about to be used for communication with the MS or which reside within a particular area (such as a given location area or paging area) of the network 110.

The case in which the A-subscriber desires to make an express call with temporarily enhanced service level is next described with reference to FIG. 3. The A-subscriber first sends a Service Level Change Request (SLCR) to the network. This SLCR can be implemented in a number of ways, including a particularly formed and/or addressed short message, with a phone call to a particular number, with an internet based request via subscriber's internet portal, for instance, or with any other mechanism capable of indicating to the network the request with sufficient authentication of the subscriber. In this case, the request is incorporated into the first signal as a prefix to the B-subscriber number of form 123*87654321 or as a postfix of form 87654321*123. Alternatively, the request can be included in a phone call request using Unstructured Supplementary Service Data (USSD). The request can be identified from the presence of a predetermined code in the prefix or in the suffix. With the first prefix, the express call request can be pre-programmed to a phone book of existing mobile phones and it is relatively easy to enter on placing a phone call by manually entering the digits of the B-subscriber number. On receiving the first signal with the SLCR, the MSC contains an indication of the SLCR in the second signal by passing the received B-subscriber number with its prefix or postfix, for example, to the SCP. Armed with the SLCR, the SCP determines whether the A-subscriber can be charged the call and proceeds placing the phone call by providing the MSC with the third signal adapted to indicate the SLCR, optionally by including supplementary information such as a prefix or postfix. The MSC obtains the fourth signal that comprises the default and maximum priority level of the A-subscriber and now furnishes the fifth signal with the maximum priority level responsive to the SLCR instead of the default priority level.

Whilst the SLCR may be indicated by particular supplementary information in the third signal S3, alternatively the third signal may be such as with normal subscribers who do not have a reduced service level subscription. In this implementation, the MSC should output the fifth signal with call control information indicative of using the maximum priority level defined in the subscriber data.

If the SLCR were allowed to indicate temporary lowering of the service level, then HLR should contain a predetermined lowest priority level and a default priority level and the MSC should normally pass in the fifth signal the default level and the predetermined lowest priority level on the MSC detecting the SLCR.

Typically, the network is configured to charge a higher rate for express calls (lower rates for lowered service level calls if used) than normally. The charging function is typically controlled by the MSC or by the SCP to account for the temporary change of service level for the duration of the call for which the service level is changed. In alternative embodiments, the charging function is performed by other network elements.

In communications over the MAP interface HLR-VLR (typically in prepaid & postpaid subscriptions), the SLCR can be conveyed, for instance, by using an adapted Routing Category. Adapted routing categories are supported by modern HLR and MSC equipment and provide end-to-end priority definition mechanism in mobile-to-mobile calls such that if so desired, the network can allocate enhanced priority to both the originating and terminating subscribers.

Alternatively, the MAP interface may employ the eMLPP service, which is also implemented in some modern HLR and MSC (including the ISUP add-on mentioned in the foregoing). In this case, one possible implementation is as follows: the subscriber record is created in the HLR. The subscriber record includes the maximum/default priority levels. Upon registration on a VLR, HLR sends maximum and default priority levels to the VLR or MSC. The MSC maps the eMLPP priority on the scale of priority levels such as 1 to 14 for BSC. For a mobile terminated call, the priority level is defined in the ISUP (ISDN User Part) set-up message to the VMSC.

The SCP can be configured to detect the change request and respectively evoke enhanced multi level precedence and preemption feature in the mobile switch center to command the mobile switch center to apply maximum priority level.

Further alternatively to using the eMLPP, CS Allocation or Retention priority can be employed on the MAP interface. This embodiment may enable providing interoperability when, for instance, either the HLR or the MSC is unable to employ the eMLPP. Hence, the CS Allocation Retention Priority (ARP) can be understood as an alternative to the eMLPP.

On the A-Interface between the MSC and the serving BSC the MSC informs the BSS about call priority and pre-emption associated with individual subscribers by using the priority message element in the fifth signal an assignment request. The serving BSC is typically capable of informing target BSC about user parameters on handover of the subscriber to the target BSC. See 3GPP TS 48.008 Section 3.1.1.1, Successful Operation, for further information on radio resource assignment in a mobile communications system.

The call control in the fifth signal may contain following data when the SLCR has been detected (class one case):

| | |
|---|---|
| Priority = | 1 |
| Preemption Capability indicator = | may preempt |
| Queuing allowed indicator = | allowed |
| Preemption Vulnerability indicator = | shall not be preempted |

The labels used indicate intended priority level (1 being the highest), whether the call being made is allowed to preempt an existing call (that is, abruptly assume resources prior assigned to another subscriber), whether the call is allowed to be placed into a queue on setting up if the network resources are not available, and whether the call shall be indicated by the BSC as one that may not be preempted. The BSC may communicate the preemption vulnerability indicator to the MS such that if the MS supports the feature, the MS can indicate to the user that the call is not indicated vulnerable for preempting.

In case that the subscriber has a subscription normally employing reduced service level and the SLCR is not made (class 2), the call control of the fifth signal may contain the following data:

| | |
|---|---|
| Priority = | 2 to 14 |
| Preemption Capability indicator = | shall not preempt |
| Queuing allowed indicator = | allowed |
| Preemption Vulnerability indicator = | might be preempted |

This class 2 case differs from class 1 case in that the call being made is only established if there are sufficient resources available without preempting other calls. The MS may be indicated of the vulnerability to preempting.

It should also be appreciated that the BSC may be configured to leave a predetermined headroom of free resources to accommodate for sudden radio interference caused needs to reallocate new channels to subscribers, for allowing data transfer and/or for enhancing the segmentation of subscriptions.

In order to facilitate the entering of a prefix to pre-stored phone numbers, the MS may be capable of combining a stored number with a prefix or postfix used for indicating the SLCR. The MS may be further configured to provide the user with an option of temporarily changing the service level and respectively to adapt the phone number as applicable.

It should be appreciated that the afore described mechanism of making an express call can also be used to indicate requests for temporarily lowered service level, in which case the network should identify that the service level is being lowered and to define respectively adapted call control for the fifth signal. Usually, when eMLPP is used and a subscriber record is created in the HLR, the record includes the maximum and default priority levels. Upon registration on a Visiting Location Register (VLR), HLR sends these maximum and default priority levels to the VLR or to the Visiting MSC (VMSC).

The MSC maps the eMLPP priority on priority levels using a scale depending on implementation for a serving Base Station Controller (BSC), which scale is, for instance, 1 to 14.

Regarding phone calls terminated to a subscriber who has the economy subscription with lowered service level, the allocation of radio resources may depend on the originating subscriber's subscription especially when the originating subscriber is responsible for the charging of the phone call. Alternatively, especially when the B-subscriber is charged for her radio access, the A subscriber may provide the B-subscriber's network with the priority level with an ISUP set-up message to the VMSC. A high priority of subscriber A can be informed to subscriber B's MSC over ISUP. This is particularly useful in order to improve the call reliability end-to-end, as a call drop could also happen at the B-subscriber's end. However, the B-party priority need not influence MSC-A resource allocation.

On establishing a phone call, the priority may be chosen at a phone call recipient's end based on the higher of the called user priority and the calling user priority.

Figure 4:
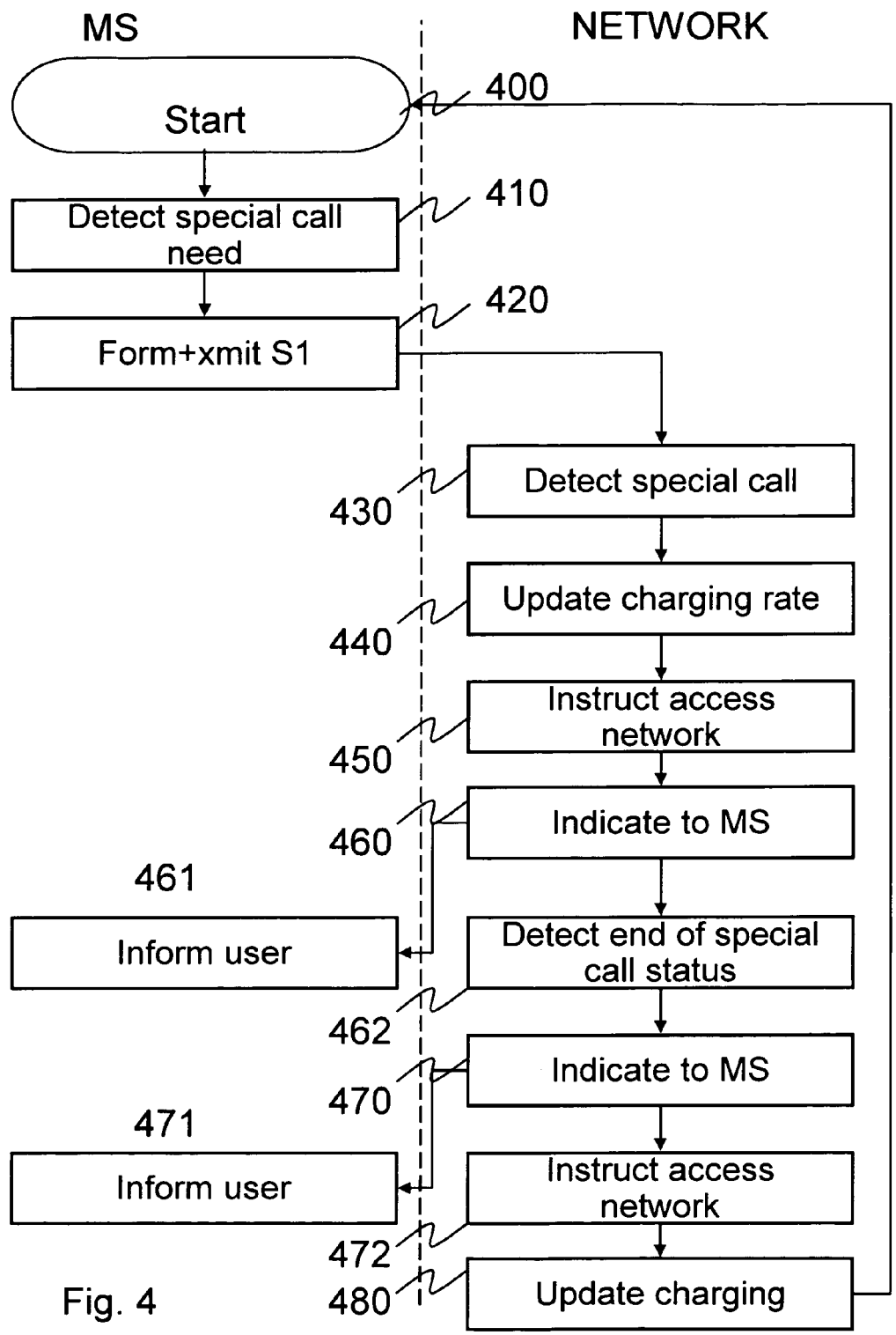
FIG. 4 presents a flow chart illustrating the basic operation of one example of the invention.

FIG. 4 presents a flow chart illustrating the basic operation of one example of the invention. The flow chart begins in step 400 at which a user indicates that a phone call should be made to a given destination. It is next detected at the caller's mobile station that a SLCR is made. Responsively, in step 420 the MS forms and transmits the first signal S1 of FIG. 3 to the network. The network receives the first signal and detects in step 430 that a special call is desired by detecting the SLCR. The network next updates the charging rate for the next phone call in step 440 to correspond with the SLCR and instructs the access network in step 450 for the change in resource usage priority. The network may next indicate the current service level or resource usage priority by a message to the MS, which may inform the user of the current service level in step 461. The operation also proceeds from step 460 to step 462 in which the end of the service level change is detected. Typically, when the service level is only changed for the following or commencing phone call, this detection of the ending of the special call status is based on detecting the end of the phone call. Alternatively, a timer may be used to detect expiry of a predetermined duration and/or number of phone calls made after the SLCR was made.

Responsively to the detection in step 462 of the ending of the special call status, the network may indicate in step 470 the current service level so that the MS may inform the user correspondingly in step 471. The operation also proceeds from the step 470 to step 472 in which the network instructs the access network of the service level to which the access network should resume after the temporary change of service level caused by the SLCR. The network next updates the charging again to correspond with the normal service level for next phone calls and resumes to step 400 to wait for the next call the user desires to originate.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

I claim:

1. An apparatus comprising:
   at least one processor;
   memory storing computer program code;
   wherein the computer program code is configured to, with the memory and the at least one processor, cause the apparatus to perform actions comprising at least: performing control operations to cause storage of priority information for each subscriber, wherein the priority information for a subscriber is based at least in part on a service class associated with the subscriber, wherein the service classes include at least a normal service class and a reduced service class, wherein the priority information for a subscriber is based on a specified level of service ordinarily guaranteed to the subscriber in comparison to other subscribers, wherein the guaranteed level of service is specified in a service agreement between the subscriber and a service provider, and wherein storage of priority information for a subscriber comprises storing information indicating relative ranking, a specific indication of ability or inability to preempt other subscribers, and a specific indication of vulnerability to or immunity from preemption by other subscribers wherein ability to preempt another subscriber is the ability to assume the resources assigned to the other subscriber, including the ability to assume resources being used in a call by the other subscriber, and immunity from preemption by other subscribers is the possibility of having resources abruptly reallocated to another subscriber, including the possibility of having resources being used in a current call abruptly reallocated to another subscriber;
   directing allocation of telecommunications network resources to subscribers who need network resources in accordance with the priority information; and
   responsive to a change request from a requesting individual subscriber associated with the reduced service class, changing the priority information for the requesting individual subscriber to that associated with the normal service class for a duration extending from the beginning of the next network connection to detection of the end of the network connection.

2. The apparatus according to claim 1, wherein the actions further comprise allocating network resources to the requesting individual subscriber in preference to subscribers who have not requested resource allocation change.

3. An apparatus according to claim 1, further comprising at least one of a service control point; a switch centre; a network controller; a packet data scheduler; a base station subsystem.

4. An apparatus according to claim 1, wherein the telecommunications network is a mobile communications network.

5. An apparatus according to claim 1, wherein the change request is obtained from a network connection request.

6. An apparatus according to claim 1, further configured to transfer the change request to the connection terminating side.

7. An apparatus according to claim 5, wherein the change request is signalled by a supplementary string selected from a group consisting of at least one of a prefix string and a postfix string.

8. An apparatus according to claim 7, wherein a predetermined code in the supplementary string identifies the change request.

9. An apparatus according to claim 8, wherein the telecommunications network comprises a mobile switch centre, and wherein changing an individual priority comprises evoking a multi level precedence and preemption feature in the mobile switch center to command the mobile switch center to apply maximum priority level.

10. A method comprising:
    configuring a processor to cause an apparatus to perform actions comprising at least: storing priority information for each subscriber, wherein the priority information for a subscriber is based at least in part on a service class associated with the subscriber, wherein the service classes include a normal service class and a reduced service class, wherein the priority information for a subscriber is based on a specified level of service ordinarily guaranteed to the subscriber in comparison to other subscribers, wherein the guaranteed level of service is specified in a service agreement between the subscriber and a service provider, and wherein storage of priority information a subscriber comprises storing information indicating relative ranking information, a specific indication of ability or inability to preempt other subscribers, and a specific indication of vulnerability to or immunity from preemption by other subscribers, wherein ability to preempt another subscriber is the ability to assume the resources assigned to the other subscriber, including the ability to assume resources being used in a call by the other subscriber, and immunity from preemption by other subscribers is the possibility of having resources abruptly reallocated to another subscriber, including the possibility of having resources being used in a current call abruptly reallocated to another subscriber;
    allocating network resources to subscribers who need network resources in accordance with the priority information; and
    in response to a change request from a requesting individual subscriber associated with the reduced service class, temporarily changing the priority information for the requesting individual subscriber to that associated with the normal service class for a duration extending from the beginning of the next network connection to detection of the end of the network connection, wherein changing the priority information comprises associating priority information with the requesting individual subscriber so as to provide a guaranteed level of service higher than the requesting individual subscriber's normally guaranteed level of service, and wherein changing the priority information includes changing at least one of the specific indication of the requesting individual subscriber's ability to preempt other subscribers and the specific indication of the requesting individual subscriber's vulnerability to or immunity from preemption by other subscribers, wherein immunity from preemption by other subscribers comprises protection from preemption by any other subscriber.

11. A method according to claim 10, wherein the change request is provided with unstructured supplementary service data signaling or with short message service signaling before the connection request.

12. A method according to claim 10, further comprising transferring the change request to the connection terminating side.

13. A method according to claim 10, wherein the change request is obtained from a network connection request.

14. A method according to claim 13, wherein the change request is signalled by a supplementary string selected from a group consisting of at least one of a prefix string and a postfix string.

15. A method according to claim 14, wherein a predetermined code in the supplementary string identifies the change request.

16. A method according to claim 15, wherein the telecommunications system comprises a mobile switch centre, and wherein the method further comprises evoking a multi level precedence and preemption feature in the mobile switch center to command the mobile switch center to apply maximum priority level.

17. A method according to claim 15, wherein the higher of the following two priorities is chosen at network connection recipient's end for use in a following network connection: called user priority, originating user priority.

18. A non-transitory computer readable medium storing a program of instructions which, when executed by a processor, configure an apparatus to at least:
store priority information for each subscriber, wherein the priority information for a subscriber is based at least in part on a service class associated with the subscriber, wherein the service classes include a normal service class and a reduced service class, wherein the priority information for a subscriber is based on a specified level of service ordinarily guaranteed to the subscriber in comparison to other subscribers, wherein the guaranteed level of service is specified in a service agreement between the subscriber and a service provider, and wherein storage of priority information for a subscriber comprises storing information indicating relative ranking, a specific indication of ability or inability to preempt other subscribers, and a specific indication of vulnerability to or immunity from preemption by other subscribers, wherein ability to preempt another subscriber is the ability to assume the resources assigned to the other subscriber, including the ability to assume resources being used in a call by the other subscriber, and immunity from preemption by other subscribers is the possibility of having resources abruptly reallocated to another subscriber, including the possibility of having resources being used in a current call abruptly reallocated to another subscriber;

allocate network resources to subscribers who need network resources in accordance with the priority information; and responsive to a change request from a requesting individual subscriber associated with the reduced service class, change the priority information for the requesting individual subscriber to that associated with the normal service class for a duration extending from the beginning of the next network connection to detection of the end of the network connection, wherein changing the priority information comprises associating priority information with the requesting individual subscriber so as to provide a guaranteed level of service higher than the requesting individual subscriber's normally guaranteed level of service, and wherein changing the priority information includes changing the specific indication of the requesting individual subscriber's ability to preempt other subscribers and further includes changing the specific indication of the requesting individual subscriber's vulnerability to or immunity from preemption by other subscribers, wherein immunity from preemption by other subscribers comprises protection from preemption by any other subscriber.

19. The computer readable medium according to claim 18, wherein the data processor executable instructions consist of instructions executable by any one of the following: a multi-purpose processor; a microprocessor; an application specific integrated circuit; a digital signal processor; and a master control processor.

20. A base station in a telecommunications network comprising:
a memory configured to store priority information for each subscriber, wherein the priority information for a subscriber is based at least in part on a service class associated with the subscriber, wherein the service classes include a normal service class and a reduced service class, wherein the priority information for a subscriber is based on a specified level of service ordinarily guaranteed to the subscriber in comparison to other subscribers, wherein the guaranteed level of service is specified in a service agreement between the subscriber and a service provider, and wherein storage of priority information for a subscriber comprises storing information indicating relative ranking, a specific indication of ability or inability to preempt other subscribers, and a specific indication of vulnerability to or immunity from preemption by other subscribers, wherein ability to preempt another subscriber is the ability to assume the resources assigned to the other subscriber, including the ability to assume resources being used in a call by the other subscriber, and immunity from preemption by other subscribers is the possibility of having resources abruptly reallocated to another subscriber, including the possibility of having resources being used in a current call abruptly reallocated to another subscriber;

a resource allocator configured to allocate network resources to subscribers who need network resources in accordance with the priority information; and an input configured to receive a signal indicative of a change request from a requesting individual subscriber; wherein the base station is configured to receive direction from the telecommunications network to, responsive to a change request from a requesting individual subscriber associated with the reduced service class, temporarily change the priority information for the requesting individual subscriber to that associated with the normal service class for a duration extending from the beginning of the next network connection to detection of the end of the network connection, wherein changing the priority information comprises associating priority information with the requesting individual subscriber so as to provide a guaranteed level of service higher than the requesting individual subscriber's normally guaranteed level of service, and wherein changing the priority information includes changing at least one of the specific indication of the requesting individual subscriber's ability to preempt other subscribers and the specific indication of the requesting individual subscriber's vulnerability to or immunity from preemption by other subscribers, wherein immunity from preemption by other subscribers comprises protection from preemption by any other subscriber.

21. A base station according to claim 20, wherein the resource allocator is further configured to allocate network resources to the individual subscribers who requested resource allocation change in preference to subscribers who have not requested resource allocation change.

22. A base station according to claim 20, wherein the resource allocator is further configured to change the individual priority of the requesting individual subscriber for the duration selected from the group consisting of: next network connection; predetermined number of subsequent network connections originated by the requesting subscriber; on-going network connection; predetermined period of time starting from the request; predetermined period of time starting from the next network connection originated by the requesting subscriber.

23. A base station according to claim 20, wherein the resource allocator comprises one or more of a service control point, a switch centre, a network controller, a packet data scheduler, and a base station subsystem.

24. A mobile station comprising:
a user interface configured to receive an input by a user indicating a selection of a desired call recipient for a network connection and configured to input an indication by the user that the network connection is a special connection, wherein the user belongs to a class of users ordinarily guaranteed a reduced level of service, wherein the available levels of service comprises the reduced level and a normal level higher than the reduced level, wherein the special connection provides for the user to receive the normal level of service from initiation of the connection until detection of termination of the connection, and wherein the guaranteed level of service comprises relative ranking, ability or inability to preempt other subscribers, and vulnerability to or immunity from preemption by other subscribers; and
a processor configured to form a request for temporary priority change for the network connection to the call recipient responsive to the indication of a special connection, wherein the request is for a priority associated with the normal level of service, wherein the guaranteed level of service is specified in a service agreement between the subscriber and a service provider, and wherein changing the priority includes changing at least one of a specific indication of the subscriber's ability or inability to preempt other subscribers and a specific indication of vulnerability to or immunity from preemption by other subscribers, wherein immunity from preemption by other subscribers comprises protection from preemption by any other subscriber, wherein ability to preempt another subscriber is the ability to assume the resources assigned to the other subscriber, including the ability to assume resources being used in a call by the other subscriber, and immunity from preemption by other subscribers is the possibility of having resources abruptly reallocated to another subscriber, including the possibility of having resources being used in a current call abruptly reallocated to another subscriber.

25. A mobile station according to claim 24, wherein the user interface is configured to provide a menu option for indication of the special connection.

26. A method, comprising:
configuring an apparatus to perform at least the functions of:
receiving an input by a user indicating a selection of a desired call recipient;
receiving an indication by the user that a connection between the user and the call recipient is to be a special network connection, wherein the user belongs to a class of users ordinarily guaranteed a reduced level of service, wherein the available levels of service comprise the reduced level and a normal level higher than the reduced level, wherein the special connection provides for the user to receive the normal level of service from initiation of the connection until detection of termination of the connection, and wherein the guaranteed level of service comprises relative ranking, ability or inability to preempt other users, and vulnerability to or immunity from preemption by other users; and
forming a request for temporary priority change for the special network connection to the call recipient responsive to the indication of the special network connection wherein the request is for a priority associated with the normal level of service, wherein the guaranteed level of service is specified in a service agreement between the subscriber and a service provider, and wherein the temporary priority change comprises a temporary change in at least one of a specific indication of ability or inability to preempt other subscribers and a specific indication of vulnerability to or immunity from preemption by other subscribers, wherein immunity from preemption by other subscribers comprises protection from preemption by any other subscriber, wherein ability to preempt another subscriber is the ability to assume the resources assigned to the other subscriber, including the ability to assume resources being used in a call by the other subscriber, and immunity from preemption by other subscribers is the possibility of having resources abruptly reallocated to another subscriber, including the possibility of having resources being used in a current call abruptly reallocated to another subscriber.

27. A non-transitory computer readable medium storing a program of instructions which, when executed by a processor, configure an apparatus to:
receive an input by a user indicating a selection of a desired call recipient; receive an indication by the user that a connection between the user and the call recipient is to be a special network connection, wherein the user belongs to a class of users ordinarily guaranteed a reduced level of service, wherein the available levels of service comprises the reduced level and a normal level higher than the reduced level, wherein the special connection provides for the user to receive the normal level of service from initiation of the connection until detection of termination of the connection, and wherein the guaranteed level of service comprises relative ranking, ability or inability to preempt other subscribers, and vulnerability to or immunity from preemption by other subscribers; and form a request for a temporary priority change for the special network connection to the desired call recipient responsive to the indication of a special network connection, wherein the request is for a priority associated with the normal level of service, wherein the guaranteed level of service is specified in a service agreement between the subscriber and a service provider, and wherein the temporary priority change comprises a change in at least one of a specific indication of ability or inability to preempt other subscribers and a specific indication of vulnerability to or immunity from preemption by other subscribers, wherein immunity from preemption by other subscribers comprises protection from preemption by any other subscriber, wherein ability to preempt another subscriber is the ability to assume the resources assigned to the other subscriber, including the ability to assume resources being used in a call by the other subscriber, and immunity from preemption by other subscribers is the possibility of having resources abruptly reallocated to another subscriber, including the possibility of having resources being used in a current call abruptly reallocated to another subscriber.

* * * * *